US009331981B2

(12) United States Patent
Jiang et al.

(10) Patent No.: US 9,331,981 B2
(45) Date of Patent: May 3, 2016

(54) METHOD AND APPARATUS FOR FILTERING URL (71) Applicant: Huawei Technologies Co., Ltd., Shenzhen (CN)

(72) Inventors: Wu Jiang, Beijing (CN); Zhihui Xue, Shenzhen (CN); Shiguang Li, Beijing (CN); Shiguang Wan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/307,014

(22) Filed: Jun. 17, 2014

(65) Prior Publication Data
US 2014/0298445 A1 Oct. 2, 2014

Related U.S. Application Data (63) Continuation of application No. PCT/CN2012/081548, filed on Sep. 18, 2012.

(30) Foreign Application Priority Data

Dec. 31, 2011 (CN) .......................... 2011 1 0459686
Feb. 1, 2012 (CN) .......................... 2012 1 0022574

(51) Int. Cl.
*H04L 29/06* (2006.01)
*G06F 17/30* (2006.01)
*H04L 29/08* (2006.01)

(52) U.S. Cl.
CPC ...... *H04L 63/0245* (2013.01); *G06F 17/30876* (2013.01); *H04L 63/0227* (2013.01); *H04L 63/0236* (2013.01); *H04L 63/20* (2013.01); *H04L 67/02* (2013.01)

(58) Field of Classification Search
CPC .................. H04L 63/0236; H04L 63/0245
See application file for complete search history.

(56) References Cited

U.S. PATENT DOCUMENTS 6,266,664 B1 * 7/2001 Russell-Falla .... G06F 17/30867
707/700
6,389,472 B1 * 5/2002 Hughes ............. G06F 17/30867
707/E17.109

(Continued)

FOREIGN PATENT DOCUMENTS

CN 101035128 A 9/2007
CN 101163161 A 4/2008

(Continued)

OTHER PUBLICATIONS

Partial English Translation and Abstract of Chinese Patent Application No. CN101350810A, Aug. 9, 2014, 2 pages.

(Continued)

*Primary Examiner* — Jason K. Gee
*Assistant Examiner* — Zhimei Zhu
(74) *Attorney, Agent, or Firm* — Conley Rose, P.C.; Grant Rodolph (57) ABSTRACT A method and an apparatus for filtering a uniform resource locator (URL). According to the method, a first category corresponding to a URL connection request can be found in a pre-stored category information table; when the first category conforms to a predetermined URL passing through policy, the URL connection request is allowed to pass through; the URL connection request is forwarded to a corresponding server; a second category corresponding to a URL is determined according to web page content returned by the server; if the second category conforms to the predetermined URL passing through policy, the web page content is sent to a client; if the second category does not conform to the predetermined URL passing through policy, the web page content is blocked. A category to which a URL belongs can be determined in real time, and implementing a function of accurate category filtration.

13 Claims, 7 Drawing Sheets

(56) References Cited

U.S. PATENT DOCUMENTS

| | | | |
|---|---|---|---|
| 2003/0014659 A1* | 1/2003 | Zhu | 713/200 |
| 2003/0163731 A1* | 8/2003 | Wigley et al. | 713/201 |
| 2004/0107177 A1 | 6/2004 | Covill et al. | |
| 2005/0021796 A1* | 1/2005 | McClain et al. | 709/229 |
| 2005/0102274 A1* | 5/2005 | Chen | G06F 17/30867 |
| 2008/0209057 A1* | 8/2008 | Martini et al. | 709/229 |
| 2010/0115615 A1 | 5/2010 | Hubbard et al. | |
| 2010/0318681 A1* | 12/2010 | Shi | G06F 15/16 709/245 |
| 2011/0289434 A1* | 11/2011 | Kieft | 715/760 |
| 2012/0167231 A1* | 6/2012 | Garcia et al. | 726/27 |
| 2013/0091580 A1* | 4/2013 | Maha et al. | 726/26 |

FOREIGN PATENT DOCUMENTS

| | | |
|---|---|---|
| CN | 101261644 A | 9/2008 |
| CN | 101350810 A | 1/2009 |
| CN | 102073722 A | 5/2011 |
| CN | 102077201 A | 5/2011 |
| CN | 102137121 A | 7/2011 |
| CN | 102185859 A | 9/2011 |
| CN | 102271331 A | 12/2011 |
| CN | 102624703 A | 8/2012 |

OTHER PUBLICATIONS

Partial English Translation and Abstract of Chinese Patent Application No. CN102073722A, Aug. 13, 2014, 2 pages.
Partial English Translation and Abstract of Chinese Patent Application No. CN101163161A, Jul. 23, 2014, 34 pages.
Partial English Translation and Abstract of Chinese Patent Application No. CN101261644A, Jul. 23, 2014, 36 pages.
Partial English Translation and Abstract of Chinese Patent Application No. CN102271331A, Aug. 9, 2014, 2 pages.
Li, S., et al., "A Model of Web Purifying Based on URL Filter and Content Filter," Computer Technology and Development, vol. 16, No. 1, Jan. 2006, 4 pages.
Li, S., et al., "A Model of Web Purifying Based on URL Filter and Content Filter," English Translation, Computer Technology and Development, vol. 16, No. 1, Jan. 2006, 10 pages.
Foreign Communication From a Counterpart Application, Chinese Application No. 201210022574.X, Chinese Office Action dated Mar. 27, 2014, 11 pages.
Foreign Communication From a Counterpart Application, PCT Application No. PCT/CN2012/081548, International Search Report dated Jan. 3, 2014, 3 pages.
Foreign Communication From a Counterpart Application, PCT Application No. PCT/CN2012/081548, Written Opinion dated Jan. 3, 2014, 10 pages.

* cited by examiner

METHOD AND APPARATUS FOR FILTERING URL

CROSS-REFERENCE TO RELATED APPLICATIONS

This application is a continuation of International Application No. PCT/CN2012/081548, filed on Sep. 18, 2012, which claims priority to Chinese Patent Application No. 201110459686.7, filed on Dec. 31, 2011 and Chinese Patent Application No. 201210022574.X, filed on Feb. 1, 2012, all of which are hereby incorporated by reference in their entireties.

TECHNICAL FIELD

The present invention relates to the field of data communications, and in particular, to a method and an apparatus for filtering a uniform resource locator (URL).

BACKGROUND

The URL filtering technology has been widely applied in the communications field, and has become a mature technology in the field of application content security. Based on different categories to which web pages belong, this technology can filter out web pages of set categories, for example, news web pages, according to requirements of a user.

When a connection request is detected by a security device having a URL filtering function, the security device obtains a category to which a URL belongs by remotely querying a categorizing server according to the URL to be connected as requested in the connection request, and then buffers the category in a local memory. In the prior art, if the category to which a URL belongs has been obtained, a filtering operation can be performed directly according to the buffered category to which the URL belongs when the user visits the URL again within an aging time period for the buffering; however, after the aging time period for the buffering expires, the category to which the URL belongs needs to be obtained by means of remote query again.

However, in a practical condition, many web pages include dynamic content; in other words, specific content and the category of the same web page that is requested to be visited may vary within different time periods. In this case, if the categorizing server does not identify variations of the web page content in a timely manner, or the categorizing server has been updated but the category to which the URL belongs, which is buffered on the security device, is still within the aging time period, the category to which the URL belongs cannot be updated in a timely manner. In this case, it is very likely that some URL connection requests that should have been filtered out are allowed to pass through, which causes inaccurate identification of URL categories and further makes it impossible to accurately implement the filtering function.

SUMMARY

In view of this, embodiments of the present invention provide a method and an apparatus for filtering a uniform resource locator (URL), so as to address a problem in the prior art that a URL cannot be accurately filtered because a categorizing server may not be updated in a timely manner.

To achieve the foregoing objective, the present invention provides the following technical solutions:

A method for filtering a URL, including: receiving a URL connection request initiated by a client; finding, among web page categories corresponding to each URL in a prestored category information table, a first category corresponding to a URL carried in the URL connection request; determining whether the first category conforms to a predetermined URL passing through policy, where the URL passing through policy includes unblocked web page categories; if the first category conforms to the predetermined URL passing through policy, sending the URL connection request to a server corresponding to the URL connection request and receiving web page content returned by the server; determining a second category corresponding to the URL according to the web page content, determining whether the second category conforms to the predetermined URL passing through policy and, if the second category conforms to the predetermined URL passing through policy, sending the web page content to the client; if the second category does not conform to the predetermined URL passing through policy, blocking the web page content.

An apparatus for filtering a uniform resource locator URL includes: a request receiving module configured to receive a URL connection request initiated by a client; a first category obtaining module configured to find, among web page categories corresponding to each URL in a prestored category information table, a first category corresponding to a URL carried in the URL connection request; a passing through determining module configured to determine whether the first category conforms to a predetermined URL passing through policy, where the URL passing through policy includes unblocked web page categories; a request sending module configured to, when a determination result of the passing through determining module is yes, send the URL connection request to a server corresponding to the URL connection request and receive web page content returned by the server; a category determining module configured to determine a second category corresponding to the URL according to the web page content, and determine whether the second category conforms to the predetermined URL passing through policy; a content returning module configured to send the web page content to the client when a determination result of the category determining module is yes; and a blocking module configured to block the web page content when the determination result of the category determining module is no.

The embodiments of the present invention disclose a method and an apparatus for filtering a URL. According to the method, a first category corresponding to a URL carried in a URL connection request can be found in a prestored category information table; the URL connection request is forwarded to a corresponding server in a case in which the URL connection request conforms to a predetermined URL passing through policy; a second category corresponding to the URL is determined according to web page content returned by the server; and it is determined whether the second category conforms to the predetermined URL passing through policy, and, if the second category conforms to the predetermined URL passing through policy, the web page content is sent to a client; if the second category does not conform to the predetermined URL passing through policy, the web page content is blocked. According to the foregoing method and apparatus for filtering a URL, a category to which the URL belongs can be determined in real time, and it is ensured that, in a case in which the web page content varies or the category is not updated in a timely manner, an unblocked URL connection request that should in fact have been blocked may be blocked in a timely manner, thereby implementing a function of accurate category filtration.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely the embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
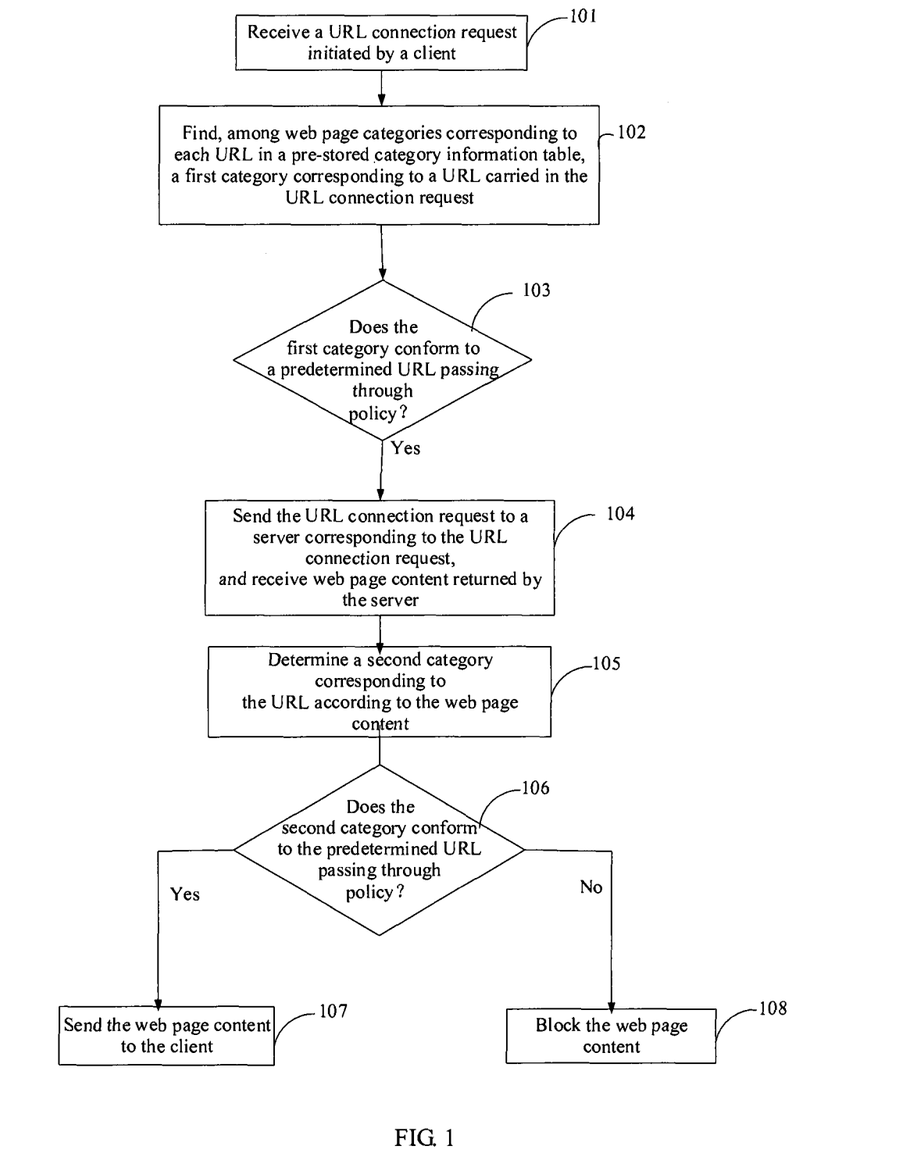
FIG. 1 is a flowchart of a first method for filtering a URL according to an embodiment of the present invention.

FIG. 1 is a flowchart of a first method for filtering a URL according to an embodiment of the present invention. As shown in FIG. 1, the method for filtering a URL may include the following steps:

Step 101: Receive a URL connection request initiated by a client.

Step 102: Find, among web page categories corresponding to each URL in a pre-stored category information table, a first category corresponding to a URL carried in the URL connection request.

Optionally, the pre-stored category information table may be a locally buffered one or be pre-stored on a remote categorizing server. Certainly, a user may also locally store pre-existing category information corresponding to all URLs and periodically update the category information to satisfy the need of filtering the URL connection request to some extent.

The pre-stored category information table may use multiple forms, for example, in a form of a recording table or in a form of a file. Certainly, the storage form is not merely limited to the foregoing two forms, and any form that can indicate a correspondence between URLs and web page categories may be used.

Certainly, if the category information corresponding to the URL carried in the URL connection request is not included in the locally buffered category information table, or if an aging time period has expired for the previously buffered category information, the pre-stored category information table needs to be obtained from the remote categorizing server and locally buffered, and then the first category corresponding to the URL carried in the URL connection request is found according to the correspondence between URLs and web page categories in the category information table.

Step 103: Determine whether the first category conforms to a predetermined URL passing through policy, where the URL passing through policy includes unblocked web page categories, and if the first category conforms to the predetermined URL passing through policy, proceed to step 104.

The URL passing through policy specifies that URLs that are not filtered out conform to the URL passing through policy, and those filtered out do not conform to the URL passing through policy. When the first category conforms to the predetermined URL passing through policy, proceed to step 104 to perform a corresponding step, and when the first category does not conform to the predetermined URL passing through policy, the URL connection request is blocked.

Step 104: Send the URL connection request to a server corresponding to the URL connection request and receive web page content returned by the server.

When the category of the URL to be connected as requested in the URL connection request conforms to a user-defined passing through policy, a related apparatus sends the URL connection request to a corresponding server which, when receiving the connection request, returns, to the related apparatus, web page content to be visited as requested in the connection request.

Step 105: Determine a second category corresponding to the URL according to the web page content.

Figure 2:
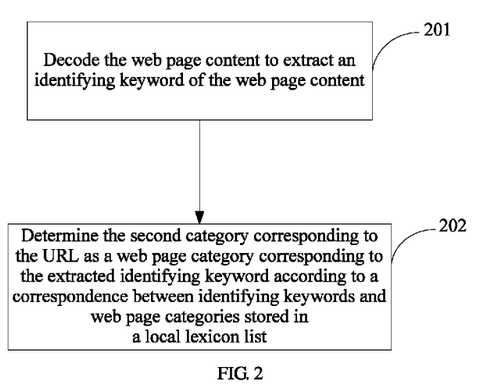
FIG. 2 is a flowchart of determining a second category of web page content according to an embodiment of the present invention.

Optionally, reference may be made to FIG. 2 for a specific procedure of a method for determining the second category corresponding to the URL. FIG. 2 is a flowchart of determining a second category of web page content according to an embodiment of the present invention. As shown in FIG. 2, the step of determining the second category of web page content may further include the following steps:

Step 201: Decode the web page content to extract an identifying keyword of the web page content;

The extracted identifying keyword herein is, for example, star, MicroBlog, short message, or the like, and certainly, it may also be some sensitive character fields such as atypical pneumonia and US president.

Step 202: Determine the second category corresponding to the URL as a web page category corresponding to the extracted identifying keyword according to a correspondence between identifying keywords and web page categories stored in a local lexicon list.

Some keywords or sensitive characters in the local lexicon list may be categorized as follows: identifying keywords corresponding to the recreational and entertainment category, including background, qq space, greeting short message, funny short message, and the like; identifying keywords corresponding to the news category, including military, finance, reports, newspapers, and the like; and identifying keywords corresponding to the sports category, including streetball, basketball, football, sailing, aerobics, and the like. If the data content extracted in step 301 includes the keyword "football", the web page category of the URL corresponding to the data content may be identified as the sports category, and if the execution body of the method for filtering a URL stipulates that URLs for the sports category cannot be visited, the web page content including the data content is blocked.

Certainly, the method for determining the second category of the URL according to the web page content is not limited to the foregoing procedure. For example, the purpose of determining the second category according to the web page content may also be achieved by extracting a semantic relationship from the web page content, matching the semantic relationship with a semantic relationship template pre-stored in a semantics library, and using a web page category corresponding to the matched semantic relationship template as the second category. Specific manners of determining the second category according to the web page content are not enumerated herein, and any method capable of determining the second category of the URL according to the web page content shall fall within the protection scope of the present invention.

Step 106: Determine whether the second category conforms to the predetermined URL passing through policy, and if the second category conforms to the predetermined URL passing through policy, proceed to step 107, and if the second category does not conform to the predetermined URL passing through policy, go to step 108.

Step 107: Send the web page content to the client.

When the second category determined in step 106 is of an unblocked web page category in the user-defined passing through policy, the returned web page content is returned to the client, so as to normally provide a service for the client.

Step 108: Block the web page content.

When the second category determined in step 106 is not of an unblocked web page category in the user-defined passing through policy, the web page content is blocked directly, the client cannot connect to the URL, and the correspondingly returned web page content is blocked.

According to the method in this embodiment, a first category corresponding to a URL carried in a URL connection request can be found in a pre-stored category information table; when the first category conforms to a predetermined URL passing through policy, the URL connection request is allowed to pass through; the URL connection request is forwarded to a corresponding server; a second category corresponding to the URL is determined according to web page content returned by the server; and it is determined whether the second category conforms to the predetermined URL passing through policy, and, if the second category conforms to the predetermined URL passing through policy, the web page content is sent to a client; and if the second category does not conform to the predetermined URL passing through policy, the web page content is blocked. According to the method for filtering a URL disclosed in the present invention, a category to which a URL belongs can be determined in real time, and it is ensured that, in a case in which the web page content varies constantly or the category is not updated in a timely manner, an unblocked URL connection request that should in fact have been blocked may be blocked in a timely manner, thereby implementing a function of accurate category filtration and improving accuracy of URL filtering.

Embodiment 2

Figure 3A:
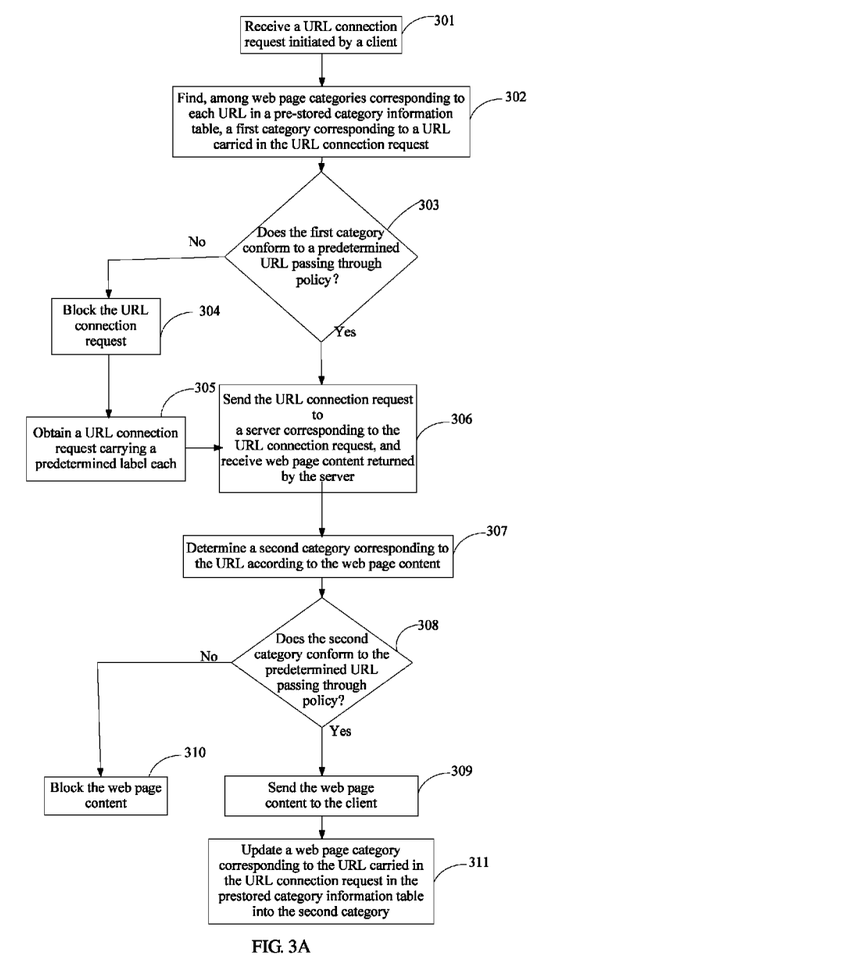
FIG. 3A is a flowchart of a second method for filtering a URL according to an embodiment of the present invention.

FIG. 3A is a flowchart of a second method for filtering a URL according to an embodiment of the present invention. As shown in FIG. 3A, the method for filtering a URL may include the following steps:

Step 301: Receive a URL connection request initiated by a client.

Step 302: Find, among web page categories corresponding to each URL in a pre-stored category information table, a first category corresponding to a URL carried in the URL connection request.

Step 303: Determine whether the first category conforms to a predetermined URL passing through policy. If the first category conforms to the predetermined URL passing through policy, go to step 306, and if the first category does not conform to the predetermined URL passing through policy, proceed to step 304.

Step 304: Block the URL connection request, and proceed to step 305.

Step 305: Filter blocked URL connection requests to obtain a URL connection request carrying a predetermined label, and proceed to step 306.

In a practical condition, content of some web pages varies dynamically, so it is possible that a category to which a URL belongs before a certain time point does not conform to the URL passing through policy but a category to which the same URL actually belongs after the time point conforms to the URL passing through policy and the URL category is not updated in a timely manner. This leads to a case in which the URL connection request that should have been unblocked is blocked. To avoid this case, a user may use the method described in this step, where the predetermined label may be a specific keyword or may be a certain fixed connection address, a user name, or the like.

Step 306: Send the URL connection request to a server corresponding to the URL connection request, and receive web page content returned by the server.

Step 307: Determine a second category corresponding to the URL according to the web page content.

Step 308: Determine whether the second category conforms to the predetermined URL passing through policy. If the second category conforms to the predetermined URL passing through policy, proceed to step 309, and if the second category does not conform to the predetermined URL passing through policy, go to step 310.

Step 309: Send the web page content to the client, and go to step 311.

Step 310: Block the web page content.

Step 311: Update a web page category corresponding to the URL carried in the URL connection request in the prestored category information table into the second category.

Figure 3B:
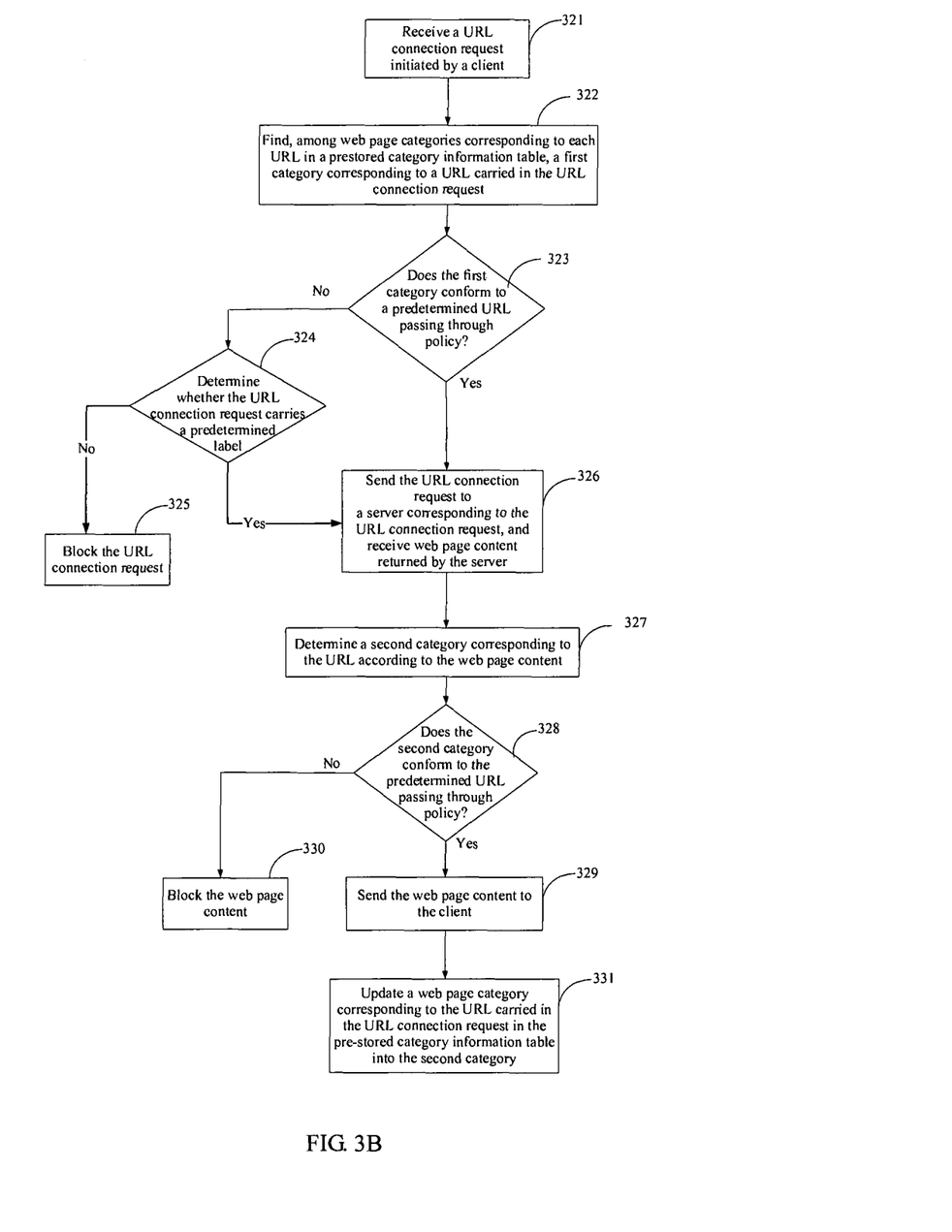
FIG. 3B is a flowchart of a third method for filtering a URL according to an embodiment of the present invention.

Optionally, the procedure shown in FIG. 3A may also be adjusted as follows: orders of step 305 and step 304 are exchanged, in other words, firstly it is determined whether a URL connection request carries a predetermined label before the URL connection request is blocked. If the URL connection request carries a predetermined label, the URL connection block is allowed to pass through; and if the URL connection request does not carry a predetermined label, the URL connection request is blocked. In other words, a batch processing manner is adjusted into real-time processing, which is further shown in FIG. 3B:

Step 321: Receive a URL connection request initiated by a client;

Step 322: Find, among web page categories corresponding to each URL in a prestored category information table, a first category corresponding to a URL carried in the URL connection request;

Step 323: Determine whether the first category conforms to a predetermined URL passing through policy. If the first category conforms to the predetermined URL passing through policy, go to step 326; and if the first category does not conform to the predetermined URL passing through policy, proceed to step 324.

Step 324: Determine whether the URL connection request carries a predetermined label. If the URL connection request carries a predetermined label, go to step 326; and if the URL connection request does not carry a predetermined label, proceed to step 325.

Step 325: Block the URL connection request.

Step 326: Send the URL connection request to a server corresponding to the URL connection request, and receive web page content returned by the server.

Step 327: Determine a second category corresponding to the URL according to the web page content.

Step 328: Determine whether the second category conforms to the predetermined URL passing through policy. If the second category conforms to the predetermined URL passing through policy, proceed to step 329; and if the second category does not conform to the predetermined URL passing through policy, go to step 330.

Step 329: Send the web page content to the client, and go to step 331.

Step 330: Block the web page content.

Step 331: Update a web page category corresponding to the URL carried in the URL connection request in the pre-stored category information table into the second category.

When it is determined according to the method disclosed in this embodiment that the second category of the returned web page content conforms to the predetermined URL passing through policy, it can be learned that the first category corresponding to the URL that is locally buffered or remotely obtained from a categorizing server is inaccurate. Then, the locally buffered first category corresponding to the URL may be updated into the second category determined according to the web page content, or a URL category changing request is sent to the remote categorizing server, so that related subsequent actions can be performed by the categorizing server according to the URL category changing request.

According to the method for filtering a URL in this embodiment, it is determined whether a URL connection request initiated by a client conforms to a predetermined URL passing through policy according to a pre-stored first category of a URL; the URL connection request is forwarded to a corresponding server in a case in which the URL connection request satisfies the predetermined URL filtering policy; a second category is determined according to web page content returned by the server; and it is determined whether the second category conforms to the predetermined URL passing through policy, and, if the second category does not conform to the predetermined URL passing through policy, the returned web page content is blocked. This can avoid some cases in which a URL connection request should have been unblocked but is blocked because a category is not updated in a timely manner. According to the method for filtering a URL disclosed in the present invention, a category to which a URL belongs can be determined in real time, and it is ensured that, in a case in which the category is not updated in a timely manner, an unblocked URL connection request that should in fact have been blocked is blocked in a timely manner, and some blocked URL connection requests that should in fact have been unblocked are unblocked in a timely manner, thereby implementing a function of accurate category filtration.

Embodiment 3

Figure 4:
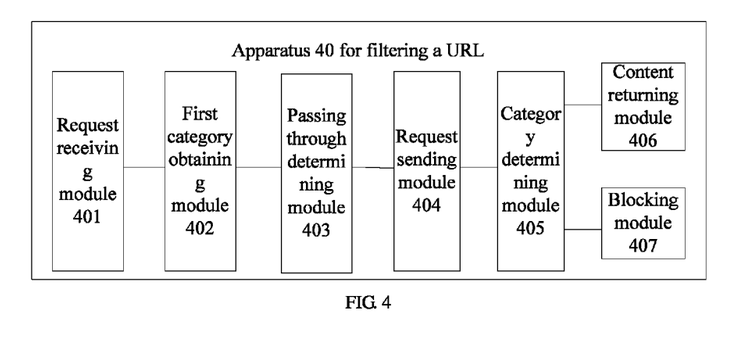
FIG. 4 is a schematic structural diagram of an apparatus for filtering a URL according to an embodiment of the present invention.
Figure 5:
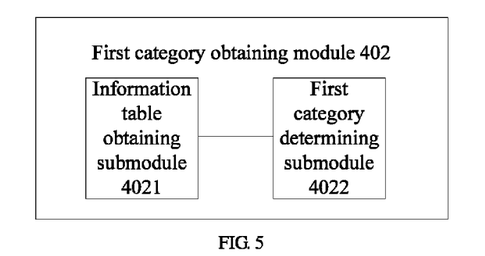
FIG. 5 is a schematic structural diagram of a first category obtaining module according to an embodiment of the present invention.
Figure 6:
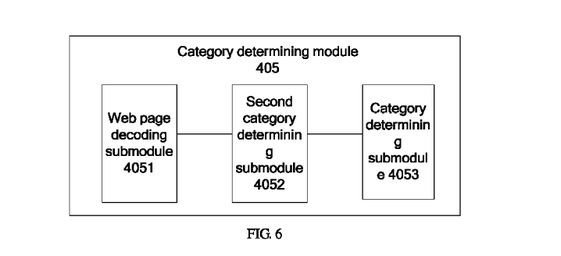
FIG. 6 is a schematic structural diagram of a category determining module according to an embodiment of the present invention.

Referring to FIG. 4, FIG. 4 is a schematic structural diagram of an apparatus for filtering a URL according to an embodiment of the present invention. The apparatus 40 for filtering a URL may include: a request receiving module 401 configured to receive a URL connection request initiated by a client; a first category obtaining module 402 configured to find, among web page categories corresponding to each URL in a pre-stored category information table, a first category corresponding to a URL carried in the URL connection request; for a specific structure of the first category obtaining module 402, reference may be made to FIG. 5. As shown in FIG. 5, the first category obtaining module 402 may further include: an information table obtaining submodule 4021 configured to obtain the prestored category information table from a remote categorizing server and locally buffer the pre-stored category information table; if the category information table of the URL corresponding to the URL connection request has been buffered locally, the category information table may be obtained directly from the local buffer; and a first category determining submodule 4022 configured to find the first category corresponding to the URL carried in the URL connection request according to a correspondence between URLs and web page categories in the category information table; a passing through determining module 403 configured to determine whether the first category conforms to a predetermined URL passing through policy, where the URL passing through policy includes unblocked web page categories; a request sending module 404 configured to, when a determination result of the passing through determining module 403 is yes, send the URL connection request to a server corresponding to the URL connection request and receive web page content returned by the server; a category determining module 405 configured to determine a second category corresponding to the URL according to the web page content, and determine whether the second category conforms to the predetermined URL passing through policy; for a specific structure of the category determining module 405, reference may be made to FIG. 6. As shown in FIG. 6, the category determining module 405 may include: a web page decoding submodule 4051 configured to decode the web page content to extract an identifying keyword of the web page content; a second category determining submodule 4052 configured to determine the second category corresponding to the URL as a web page category corresponding to the extracted identifying keyword according to a correspondence between identifying keywords and web page categories stored in a local lexicon list; and a category determining submodule 4053 configured to determine whether the second category identified by the second category determining submodule 4052 conforms to the URL passing through policy; a content returning module 406 configured to send the web page content to the client when a determination result of the category determining module is yes; and a blocking module 407 configured to block the web page content when the determination result of the category determining module is no.

It should be noted that, the apparatus for filtering a URL according to the embodiment of the present invention is not merely limited to the foregoing structure. For example, the first category obtaining module 402 and the passing through determining module 403 may be integrated into one separate module to complete obtaining of the first category of the URL connection request and determining of whether the first category conforms to the predetermined passing through policy. For another example, the content returning module 406 and the blocking module 407 may be one module.

In other embodiments, the apparatus for filtering a URL may further include a category updating module configured to, in a case in which the category determining module 405 determines that the second category does not conform to the predetermined URL passing through policy, update the web page category corresponding to the URL carried in the URL connection request in the locally buffered category information table into the second category.

Figure 7:
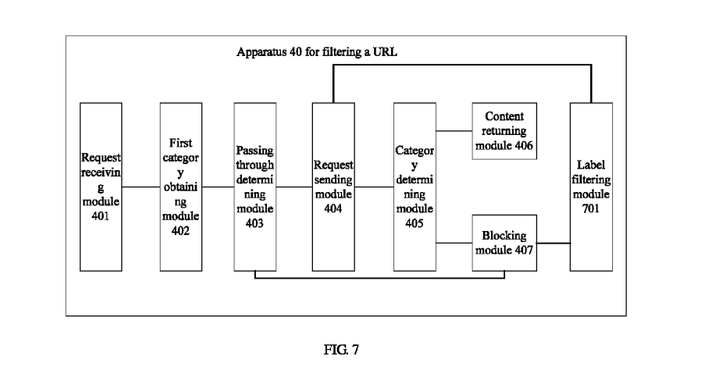
FIG. 7 is a schematic structural diagram of a second apparatus for filtering a URL according to an embodiment of the present invention.

Further, referring to FIG. 7, in other embodiments, the blocking module 407 is further configured to block the URL connection request in a case in which the passing through determining module 403 determines that the first category does not conform to the predetermined URL passing through policy.

The apparatus for filtering a URL may further include a label filtering module 701 configured to: filter blocked URL connection requests to obtain URL connection requests carrying a predetermined label each; trigger the request sending module 404 to send the URL connection request to a server corresponding to the URL connection request and receive web page content returned by the server; the category determining module 405 determines a second category corresponding to the URL according to the web page content, and determines whether the second category conforms to the predetermined URL passing through policy; and if the second category conforms to the predetermined URL passing through policy, the content returning module 406 sends the web page content to the client, and if the second category does not conform to the predetermined URL passing through policy, the blocking module 407 blocks the web page content.

Figure 8:
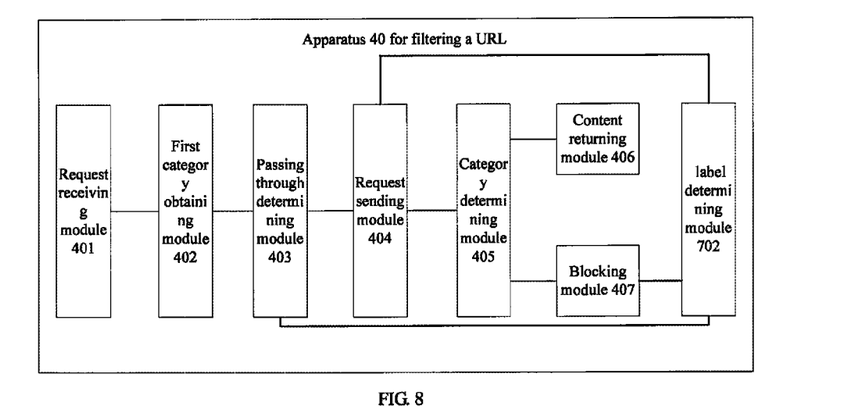
FIG. 8 is a schematic structural diagram of a third apparatus for filtering a URL according to an embodiment of the present invention.

Further, referring to FIG. 8, in other embodiments, the apparatus for filtering a URL may further include a label determining module 702 configured to, when the determination result of the passing through determining module 403 is no, determine whether the URL connection request carries a predetermined label; if the URL connection request carries a predetermined label, trigger the request sending module 404 to send the URL connection request to a server corresponding to the URL connection request and receive web page content returned by the server; the category determining module 405 determines a second category corresponding to the URL according to the web page content, and determines whether the second category conforms to the predetermined URL passing through policy; and if the second category conforms to the predetermined URL passing through policy, the content returning module 406 sends the web page content to the client, and if the second category does not conform to the predetermined URL passing through policy, the blocking module 407 is triggered to block the web page content; and if the URL connection request does not carry a predetermined label, the blocking module 407 is triggered to block the URL connection request.

The apparatus in this embodiment can find, in a pre-stored category information table, a first category corresponding to a URL connection request; passing through the URL connection request, where when the first category conforms to a predetermined URL passing through policy, the URL connection request is allowed to pass through; forward the URL connection request to a corresponding server; determine a second category corresponding to a URL according to web page content returned by the server; and determine whether the second category conforms to the predetermined URL passing through policy, and, if the second category conforms to the predetermined URL passing through policy, send the web page content to a client; and if the second category does not conform to the predetermined URL passing through policy, block the web page content. According to the apparatus for filtering a URL disclosed in the present invention, a category to which a URL belongs can be determined in real time, and it is ensured that, in a case in which the category is not updated in a timely manner, an unblocked URL connection request that should in fact have been blocked is blocked in a timely manner, thereby implementing a function of accurate category filtration.

Figure 9:
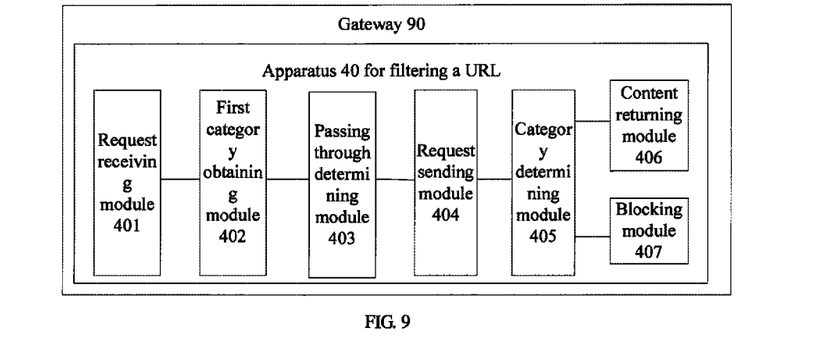
FIG. 9 is a schematic structural diagram of a gateway according to an embodiment of the present invention.

In addition, an embodiment of the present invention further discloses a gateway. As shown in FIG. 9, the gateway 90 includes an apparatus 40 for filtering a URL disclosed in the embodiments of the present invention, which can firstly, receive a URL connection request initiated by a client; then determine whether the URL connection request conforms to a predetermined URL passing through policy according to a first category of an obtained URL; if the URL connection request conforms to the predetermined URL passing through policy, send the URL connection request to a server corresponding to the URL connection request and receive web page content returned by the server; then determine a second category of the web page content, and determine whether the second category conforms to the URL passing through policy; and if the second category conforms to the URL passing through policy, send the returned web page content to the client, and if the second category does not conform to the URL passing through policy, block the returned web page content. The gateway can determine, in real time, a category to which a URL belongs, and ensure that, in a case in which the category is not updated in a timely manner, an unblocked URL connection request that should in fact have been blocked is blocked in a timely manner, thereby implementing a function of accurate category filtration.

Embodiments in this specification are described in a progressive manner, and for identical or similar portions between different embodiments, reference may be made to each other so that each of the embodiments focuses on differences from the other embodiments. The apparatus disclosed in the embodiments is described relatively simply because it corresponds to the method disclosed in the embodiments, and for portions related to those of the method, reference may be made to the description of the method.

It should further be noted that, terms used herein to express relationships such as first and second are only intended to distinguish one entity or operation from another, but not necessarily dictate or imply any such actual relationships or sequence between these entities or operations. Moreover, terms "comprise", "include", or any other variants thereof are intended to cover non-exclusive inclusion so that a process, method, article, or device that includes a series of elements not only includes these very elements, but may also include other elements not expressly listed, or also include elements inherent to this process, method, article, or device. Without being subject to further limitations, an element defined by a phrase "including a . . . " does not exclude presence of other identical elements in the process, method, article, or device that includes the very element.

Steps of methods or algorithms described with reference to the embodiments disclosed herein may be implemented directly by hardware, a software module executed by a processor, or a combination thereof. The software module may be disposed in a random access memory (RAM), a memory, a read only memory (ROM), an electrically programmable ROM, an electrically erasable programmable ROM, a register, a hard disk, a movable disk, a compact disc ROM (CD-ROM), or a storage medium of any other form that is well known in the art.

The embodiments disclosed above are described to enable a person skilled in the art to implement or use the present invention. Various modifications to these embodiments will be obvious to a person skilled in the art, and the general principles defined herein may also be implemented in other embodiments without departing from the spirit or scope of the present invention. Therefore, the present invention is not intended to be limited to these embodiments illustrated herein, but shall be construed in the widest scope consistent with the principles and novel features disclosed herein.

What is claimed is:

1. A method for filtering a uniform resource locator (URL), comprising:
    receiving a first URL connection request initiated by a client;
    finding, among correspondence between web page categories and URLs in a pre-stored category information table, a first category corresponding to a URL carried in the first URL connection request;
    determining that the first category does not conform to a predetermined URL passing through policy, wherein the URL passing through policy comprises unblocked web page categories;
    based upon the determining, sending the first URL connection request to a first server corresponding to the URL carried in the first URL connection request when the first URL connection request carries a predetermined label;
    receiving web page content returned by the first server;
    determining a second category corresponding to the URL according to the web page content; and
    sending the web page content to the client when the determined second category conforms to the predetermined URL passing through policy.

2. The method according to claim 1, further comprising:
    receiving a second URL connection request initiated by the client;
    finding, among correspondence between web page categories and URLs in the pre-stored category information table, a first category corresponding to a URL carried in the second URL connection request;
    determining that the first category corresponding to the URL carried in the second URL connection request conforms to the predetermined URL passing through policy;
    sending the second URL connection request to a second server corresponding to the second URL connection request;
    receiving web page content returned by the second server;
    determining a second category corresponding to the URL carried in the second URL connection request according to the web page content; and
    blocking the web page content when the second category corresponding to the URL carried in the second URL connection request does not conform to the predetermined URL passing through policy, wherein determining the second category corresponding to the URL carried in the second URL connection request according to the web page content comprises:
        decoding the web page content to extract an identifying keyword of the web page content;
        searching for a web page category corresponding to the extracted identifying keyword according to a correspondence between identifying keywords and web page categories stored in a local lexicon list; and
        determining the second category corresponding to the URL carried in the second URL connection request is the web page category corresponding to the extracted identifying keyword.

3. The method according to claim 2, wherein the second category corresponding to the URL carried in the second URL connection request does not conform to the predetermined URL passing through policy, and wherein the method further comprises updating the web page category corresponding to the URL carried in the second URL connection request in the pre-stored category information table into the second category.

4. The method according to claim 1, wherein finding the first category corresponding to the URL carried in the first URL connection request comprises:
    obtaining the pre-stored category information table from a remote categorizing server and locally buffering the pre-stored category information table; and
    finding the first category corresponding to the URL carried in the first URL connection request according to a correspondence between URLs and web page categories in the pre-stored category information table.

5. The method according to claim 1, wherein when the second category conforms to the predetermined URL passing through policy, the method further comprises updating the web page category corresponding to the URL carried in the first URL connection request in the pre-stored category information table into the second category.

6. The method according to claim 1, further comprises:
    receiving a third URL connection request initiated by a client;
    finding, among correspondence between web page categories and URLs in a pre-stored category information table, a first category corresponding to a URL carried in the third URL connection request;
    determining that the first category corresponding to a URL carried in the third URL connection request does not conform to a predetermined URL passing through policy;
    based upon the determining, blocking the third URL connection request when the third URL connection request does not carries a predetermined label.

7. An apparatus for filtering a uniform resource locator (URL), comprising:
    a memory;
    a processor coupled to the memory and configured to:
        receive a first URL connection request initiated by a client;
        find, among correspondence between web page categories and URLs in a pre-stored category information table, a first category corresponding to a URL carried in the first URL connection request;
        determine that the first category does not conform to a predetermined URL passing through policy, wherein the URL passing through policy comprises unblocked web page categories;
        based upon the determining, send the first URL connection request to a first server corresponding to the URL carried in the first URL connection request when the first URL connection request carries a predetermined label;
        receive web page content returned by the first server;
        determine a second category corresponding to the URL according to the web page content; and
        send the web page content to the client when the determined second category conforms to the predetermined URL passing through policy.

8. The apparatus according to claim 7, wherein the processor is further configured to:
    receive a second URL connection request initiated by the client;
    find, among correspondence between web page categories and URLs in the pre-stored category information table, a first category corresponding to a URL carried in the second URL connection request;

determine that the first category corresponding to the URL carried in the second URL connection request conforms to the predetermined URL passing through policy;

send the second URL connection request to a second server corresponding to the second URL connection request;

receive web page content returned by the second server;

determine a second category corresponding to the URL carried in the second URL connection request according to the web page content; and block the web page content when the second category corresponding to the URL carried in the second URL connection request does not conform to the predetermined URL passing through policy, wherein determining a second category corresponding to the URL carried in the second URL connection request according to the web page content comprises:

decoding the web page content to extract an identifying keyword of the web page content;

searching for a web page category corresponding to the extracted identifying keyword according to a correspondence between identifying keywords and web page categories stored in a local lexicon list; and determining the second category corresponding to the URL carried in the second URL connection request is the web page category corresponding to the extracted identifying keyword.

9. The apparatus according to claim 8, wherein the processor is further configured to update the web page category corresponding to the URL carried in the second URL connection request in the locally buffered pre-stored category information table into the second category when the second category corresponding to the URL carried in the second URL connection request does not conform to the predetermined URL passing through policy.

10. The apparatus according to claim 7, wherein the processor is further configured to:

obtain the pre-stored category information table from a remote categorizing server and locally buffer the pre-stored category information table; and find the first category corresponding to the URL carried in the first URL connection request according to a correspondence between URLs and web page categories in the pre-stored category information table.

11. The apparatus according to claim 10, wherein the processor is further configured to update the web page category corresponding to the URL carried in the first URL connection request in the locally buffered category information table into the second category when the second category conforms to the predetermined URL passing through policy.

12. The apparatus according to claim 7, wherein the processor is configured to:

receive a third URL connection request initiated by a client;

find, among correspondence between web page categories and URLs in a pre-stored category information table, a first category corresponding to a URL carried in the third URL connection request;

determine that the first category corresponding to a URL carried in the third URL connection request does not conform to a predetermined URL passing through policy;

based upon the determining, block the third URL connection request when the third URL connection request does not carry a predetermined label.

13. An apparatus for filtering a uniform resource locator (URL), comprising:

a processor and a memory coupled to the processor;

wherein the processor is configured to:

receive a URL connection request initiated by a client;

find, among correspondence between web page categories and URLs in a pre-stored category information table, a first category corresponding to a URL carried in the URL connection request;

determine whether the first category conforms to a predetermined URL passing through policy, wherein the URL passing through policy comprises unblocked web page categories;

block the web page content when the first category does not conform to the predetermined URL passing through policy;

filter blocked URL connection requests to obtain URL connection requests carrying a predetermined label;

send each of the URL connection request obtained by filtering to a server corresponding to the URL connection request; and receive web page content returned by the server, determine a second category corresponding to the URL according to the returned web page content; and determine whether the second category conforms to the predetermined URL passing through policy, send the web page content to the client when the second category conforms to the predetermined URL passing through policy, and block the web page content when the second category does not conform to the predetermined URL passing through policy.

* * * * *